March 8, 1966  G. B. HARVEY  3,239,021
ENDLESS TREAD VEHICLE
Filed Aug. 23, 1963
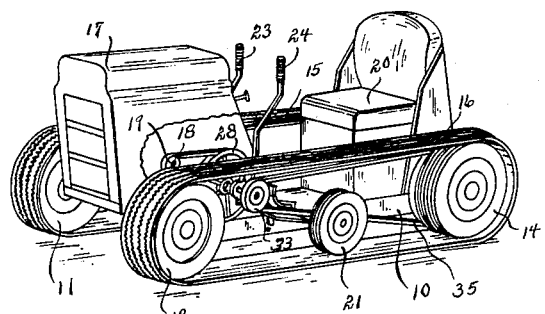
Fig. 1
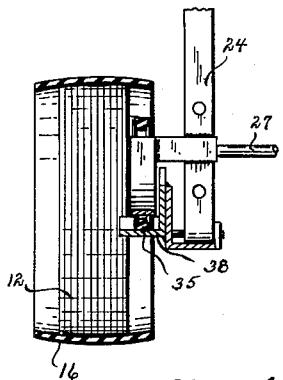
Fig. 4
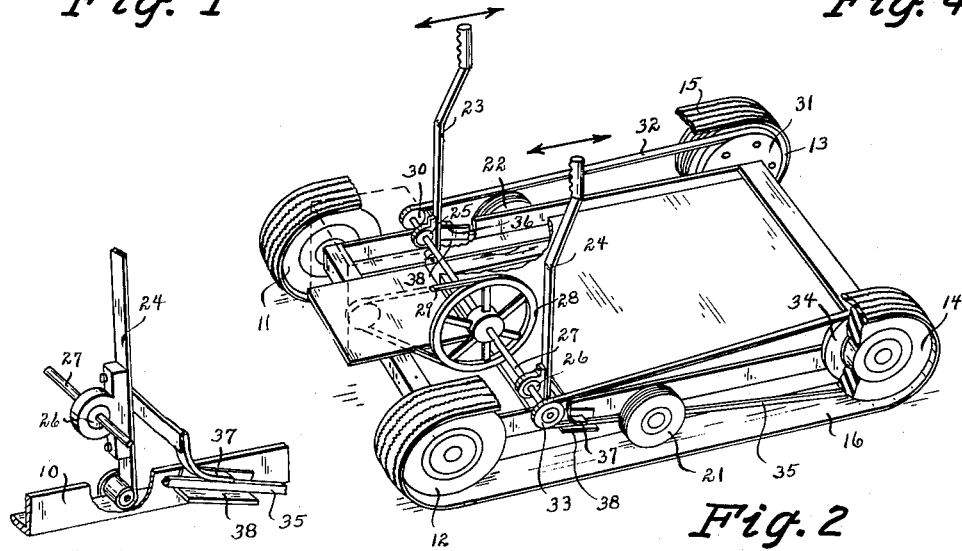
Fig. 5
Fig. 2
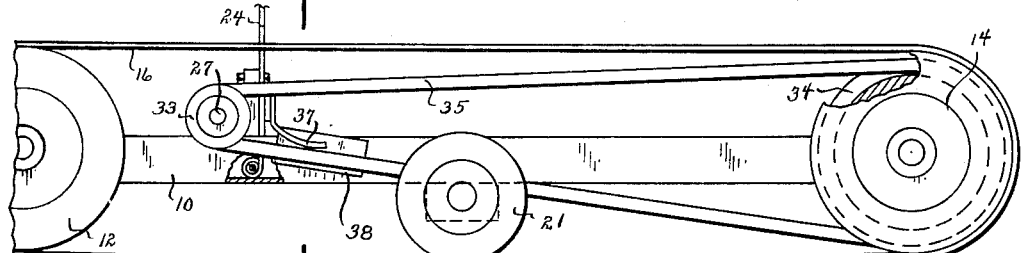
Fig. 3
INVENTOR
GERALD HARVEY
BY
Talbert Dick & Darley
ATTORNEYS

United States Patent Office 3,239,021
Patented Mar. 8, 1966

3,239,021
ENDLESS TREAD VEHICLE
Gerald B. Harvey, Waukee, Iowa
Filed Aug. 23, 1963, Ser. No. 304,188
3 Claims. (Cl. 180—6.7)

This invention relates to powered vehicles and more particularly to a vehicle that is under the complete control of the operator by the actuation of only two levers.

Most automotive vehicles have an independent steering means, an independent braking means and an independent means to operatively connect and disconnect the prime mover with the traction wheels. Obviously such mechanisms are complicated and require considerable skill on the part of the operator.

Therefore one of the principal objects of my invention is to provide a simplified control means for powered vehicles.

A further object of this invention is to provide an automotive vehicle that will turn in a relatively small radius.

A still further object of this invention is to provide a powered vehicle that will successfully move over rather large obstructions.

A still further object of this invention is to provide a powered vehicle that is of such uncomplicated nature that even a child may operate it.

Still further objects of my invention are to provide an automotive vehicle that is economical in manufacture and durable in use.

These and other objects will be apparent to those skilled in the art.

The invention consists in the construction, arrangements, and combination, of the various parts of the device, whereby the objects contemplated are attained as hereinafter more fully set forth, specifically pointed out in the claims, and illustrated in the accompanying drawings, in which:

FIG. 1 is a perspective view of my vehicle.

FIG. 2 is an enlarged perspective view of the vehicle with sections cut away to more fully illustrate its construction.

FIG. 3 is an enlarged side view of the lower portion of the vehicle.

FIG. 4 is a cross-sectional view, taken on line 4—4 of FIG. 3, and

FIG. 5 is a perspective view of one of the lever controls of the vehicle.

In these drawings I have used the numeral 10 to generally designate the chassis of my vehicle. The front end of the chassis 10 has two rotatably mounted support wheels 11 and 12. The rear end of the chassis has two rotatably mounted support wheels 13 and 14. These wheels are not steerable. Embracing the wheels 11 and 13 is a belt tread 15. A like belt tread 16 embraces the wheels 12 and 14. These belt treads may be made by removing and using the tread portion of used large pneumatic vehicle tires. On the forward end area of the chassis is the prime mover 17 having a drive shaft 18 and thereon a pulley wheel 19. A seat 20 is on the rear end area of the chassis as shown in FIG. 1. A rotatably mounted idler wheel 21 is secured to the central area of the chassis and engages the inside of the bottom length of the belt tread 16. A like idler wheel 22 engages the inside of the bottom length of the belt tread 15. Hinged at its lower end to the right side of the chassis and forward of the seat 20 is the right hand control lever 23. Hinged at its lower end to the left side of the chassis and forward of the seat 20 is the left hand control lever 24. The lever 23 has a bearing 25 and the lever 24 has a bearing 26. Loosely rotatably extending through the two bearings 25 and 26 is a shaft 27. The numeral 28 designates a relatively large V-belt pulley wheel. The numeral 29 designates a V-belt embracing the pulleys 19 and 28. The numeral 30 designates a relatively small V-grooved pulley wheel on the right end portion of the shaft 27. The numeral 31 designates a relatively large V-grooved pulley wheel secured to the wheel 13. The numeral 32 designates a V-belt embracing the pulley wheels 30 and 31. The numeral 33 designates a relatively small V-grooved pulley wheel on the left end portion of the shaft 27. The numeral 34 designates a relatively large V-grooved pulley wheel secured to the wheel 14. The numeral 35 designates a V-belt embracing the pulley wheels 33 and 34. The numeral 36 designates a brake shoe on the control lever 23 capable of engaging the inside of the bottom length of the belt 32. The numeral 37 designates a similar brake shoe on the control lever 25 capable of engaging the inside bottom length of the belt 35. Below each of these brake shoes and below the belt they may engage is a ledge 38 secured to the chassis 10, as shown in FIG. 3. The lever unit phase 23 for the left side of the vehicle is the same as the lever unit phase 24 for the right.

The practical operation of the device is as follows:

With the operator on the seat 20 and with the engine running, the manual movement of the levers 23 and 24, forwardly, will tighten the drive belts 32 and 35. Inasmuch as the shaft 27 is operatively connected to the prime mover, the two rear wheels 13 and 14 will be rotated. As the wheels 13 and 14 are inside the tread belts 15 and 16, respectively, these belts will be rotated and the vehicle will move forwardly. With the control levers in a forward direction of their movements, the brake shoes 36 and 37 will be out of braking contact with the belts 32 and 35. However, if both the control levers 23 and 24 are manually moved to the rear, the pulley wheels 30 and 33 will be moved to the rear thus loosening the belts 32 and 35. With the belts 32 and 35 in such loosened condition, they will slip on the pulley wheels 30 and 33, and the rear vehicle wheels 13 and 14 will not be rotated. Also the rear movements of the control levers 23 and 24 will bring the brake shoes 36 and 37 into contact with the belts 32 and 35, respectively, and brake these belts from turning. With the belts 32 and 35 locked against rotation this brake action will result in the operational braking of the tread belts 15 and 16 and the vehicle will be thus held against movement. As herebefore indicated, each of the control levers are independent of the other. This makes possible the successful steering of the vehicle. If it is desired to turn the vehicle to the right, the control lever 23 is pulled rearwardly thereby either slowing the rotation of the tread belt 15 or stopping its rotation entirely. With the tread belt 16 rotating, it will move the left side of the vehicle in a circle to the right. In like manner, if it is desired to turn the vehicle to the left the control lever 24 is pulled rearwardly. With a tread belt locked against any rotation, it is possible to turn the vehicle in substantially a distance equal to the length of the vehicle.

The independent movement of the various parts is possible by using loose tolerances.

From the foregoing it will be appreciated that I have provided a simplified, easily controlled vehicle of the endless tread type.

Some changes may be made in the construction and arrangement of my automotive vehicle without departing from the real spirit and purpose of my invention, and it is my intention to cover by my claims, any modified forms of structure or use of mechanical equivalents which may be reasonably included within their scope.

I claim:
1. In a powered vehicle,
a chassis,
a first rotatably mounted wheel on the left front end portion of said chassis,
a second rotatably mounted wheel on the right front end portion of said chassis,
a third rotatably mounted wheel on the left rear end portion of said chassis,
a fourth wheel on the right rear end portion of said chassis,
a pulley wheel secured to said third wheel,
a second pulley wheel secured to said fourth wheel,
a left control lever hinged to said chassis,
a right control lever hinged to said chassis,
a bearing on each of said control levers,
a shaft journalled through said bearings,
a prime mover operatively connected to said shaft,
a pulley wheel secured to said shaft,
a belt embracing said last mentioned pulley wheel and said first pulley wheel on said third wheel,
a second pulley wheel secured to said shaft,
a second belt embracing said second pulley wheel on said shaft and said second pulley wheel on said fourth wheel,
a brake shoe on said left control lever capable of engaging said first belt when said control lever is moved rearwardly to slow the rotation of said first belt,
and a brake shoe on said right control lever capable of engaging said second belt when said right control lever is moved rearwardly to slow the rotation of said second belt.

2. In a powered vehicle,
a chassis,
a first rotatably mounted wheel on the left front end portion of said chassis,
a second rotatably mounted wheel on the right front end portion of said chassis,
a third rotatably mounted wheel on the left rear end portion of said chassis,
a fourth wheel on the right rear end portion of said chassis,
a pulley wheel secured to said third wheel,
a second pulley wheel secured to said fourth wheel,
a left control lever hinged to said chassis,
a right control lever hinged to said chassis,
a bearing on each of said control levers,
a shaft journalled through said bearings,
a prime mover operatively connected to said shaft,
a pulley wheel secured to said shaft,
a belt embracing said last mentioned pulley wheel and said first pulley wheel on said third wheel,
a second pulley wheel secured to said shaft,
a second belt embracing said second pulley wheel on said shaft and said second pulley wheel on said fourth wheel,
a brake shoe on said left control lever capable of engaging said first belt when said control lever is moved rearwardly,
a brake shoe on said right control lever capable of engaging said second belt when said right control lever is moved rearwardly,
a tread belt embracing said first and third wheels,
and a tread belt embracing said second and fourth belts.

3. In a powered vehicle,
a chassis,
a first rotatably mounted wheel on the left front end portion of said chassis,
a second rotatably mounted wheel on the right front end portion of said chassis,
a third rotatably mounted wheel on the left rear end portion of said chassis,
a fourth wheel on the right rear end portion of said chassis,
a pulley wheel secured to said third wheel,
a second pulley wheel secured to said fourth wheel,
a left control lever hinged to said chassis,
a right control lever hinged to said chassis,
a bearing on each of said control levers,
a shaft journalled through said bearings,
a prime mover operatively connected to said shaft,
a pulley wheel secured to said shaft,
a belt embracing said last mentioned pulley wheel and said first pulley wheel on said third wheel,
a second pulley wheel secured to said shaft,
a second belt embracing said second pulley wheel on said shaft and said second pulley wheel on said fourth wheel,
a brake shoe on said left control lever capable of engaging said first belt when said control lever is moved rearwardly,
a brake shoe on said right control lever capable of engaging said second belt when said right control lever is moved rearwardly,
a first ledge on said chassis below said brake shoe in said left control lever and below the belt engageable by that brake shoe,
and a second ledge on said chassis below said brake shoe on said right control lever and below the belt engageable by that brake shoe, said first belt being squeezed between said brake shoe on said left control lever and said first ledge to slow the rotation of said first belt when said left control lever is moved rearwardly, said second belt being squeezed between said brake shoe on said right control lever and said second ledge to slow the rotation of said second belt when said right control lever is moved rearwardly.

References Cited by the Examiner

UNITED STATES PATENTS

| 820,102 | 5/1906 | Duer | 74—219 X |
|---|---|---|---|
| 828,713 | 8/1906 | Coffman et al. | |
| 842,260 | 1/1907 | Sheer. | |
| 2,585,315 | 2/1952 | Herman | 180—6.2 |
| 2,633,370 | 3/1953 | Johnston et al. | 180—6.7 X |
| 2,698,667 | 1/1955 | Kropp | 180—6.7 X |

BENJAMIN HERSH, *Primary Examiner.*

A. HARRY LEVY, *Examiner.*